US011494616B2

(12) United States Patent
Guo et al.

(10) Patent No.: US 11,494,616 B2
(45) Date of Patent: Nov. 8, 2022

(54) DECOUPLING CATEGORY-WISE INDEPENDENCE AND RELEVANCE WITH SELF-ATTENTION FOR MULTI-LABEL IMAGE CLASSIFICATION

(71) Applicant: Shenzhen Malong Technologies Co., Ltd., Shenzhen (CN)

(72) Inventors: Sheng Guo, Shenzhen (CN); Weilin Huang, Shenzhen (CN); Matthew Robert Scott, Shenzhen (CN); Luchen Liu, Shenzhen (CN)

(73) Assignee: Shenzhen Malong Technologies Co., Ltd., Shenzhen (CN)

( * ) Notice: Subject to any disclaimer, the term of this patent is extended or adjusted under 35 U.S.C. 154(b) by 777 days.

(21) Appl. No.: 16/509,391

(22) Filed: Jul. 11, 2019

(65) Prior Publication Data
US 2020/0356842 A1  Nov. 12, 2020

Related U.S. Application Data

(60) Provisional application No. 62/845,726, filed on May 9, 2019.

(51) Int. Cl.
*G06N 3/04* (2006.01)
*G06F 17/15* (2006.01)
(Continued)

(52) U.S. Cl.
CPC ........... *G06N 3/0472* (2013.01); *G06F 17/15* (2013.01); *G06F 17/18* (2013.01); *G06K 9/628* (2013.01); *G06N 3/0481* (2013.01); *G06V 20/20* (2022.01)

(58) Field of Classification Search
CPC .. G06N 3/0472; G06N 3/0481; G06N 3/0454; G06N 3/08; G06N 3/04; G06N 3/084; G06N 20/00; G06N 3/0445; G06N 5/04; G06N 3/02; G06N 5/046; G06F 17/15; G06F 17/18; G06K 9/628; G06K 9/6271; G06K 9/6256; G06K 9/6267; G06K 9/6257; G06K 9/6268; G06K 9/6232; G06K 9/6251; G06K 9/6262; G06K 9/6261; G06K 9/6274; G06K 9/6276; G06K 9/6277; G06V 20/20; G06V 10/82; G06V 10/454; G06V 10/44; G06V 20/52; G06V 10/462; G06V 20/10; G06V 20/56; G06V 10/22;
(Continued)

(56) References Cited

U.S. PATENT DOCUMENTS 10,109,051 B1 * 10/2018 Natesh ................... G06V 10/56
10,762,644 B1 *  9/2020 Mahadevan ........... G06N 3/084
(Continued)

*Primary Examiner* — Michael S Osinski
(74) *Attorney, Agent, or Firm* — Shook, Hardy & Bacon L.L.P.

(57) ABSTRACT

Methods and systems are provided for generating a multi-label classification system. The multi-label classification system can use a multi-label classification neural network system to identify one or more labels for an image. The multi-label classification system can explicitly take into account the relationship between classes in identifying labels. A relevance sub-network of the multi-label classification neural network system can capture relevance information between the classes. Such a relevance sub-network can decouple independence between classes to focus learning on relevance between the classes.

20 Claims, 9 Drawing Sheets

(51) Int. Cl.
    *G06K 9/62*      (2022.01)
    *G06F 17/18*     (2006.01)
    *G06V 20/20*     (2022.01)

(58) Field of Classification Search
    CPC .... G06V 10/40; G06V 10/7715; G06V 20/70;
           G06T 2207/20084; G06T 2207/20081;
           G06T 7/73; G06T 11/206; G06T
           2207/10024; G06T 2207/10028; G06T
           2210/12; G06T 3/4046; G06T 7/00
    See application file for complete search history.

(56) References Cited

U.S. PATENT DOCUMENTS

| | | | | |
|---|---|---|---|---|
| 10,891,765 | B2* | 1/2021 | Oobuchi | G06K 9/628 |
| 11,004,135 | B1* | 5/2021 | Sandler | G06Q 30/0631 |
| 11,170,257 | B2* | 11/2021 | Li | G06N 3/0445 |
| 2017/0124432 | A1* | 5/2017 | Chen | G06T 1/60 |
| 2018/0018553 | A1* | 1/2018 | Bach | G06F 40/279 |
| 2018/0025271 | A1* | 1/2018 | Sawada | G06N 3/04 |
| | | | | 706/25 |
| 2018/0096457 | A1* | 4/2018 | Savvides | G06K 9/6256 |
| 2018/0260698 | A1* | 9/2018 | Lin | G06K 9/6276 |
| 2018/0330198 | A1* | 11/2018 | Harary | G06V 20/36 |
| 2020/0143169 | A1* | 5/2020 | Vaezi Joze | G06K 9/6271 |
| 2020/0151448 | A1* | 5/2020 | Lin | G06N 3/0454 |
| 2020/0302248 | A1* | 9/2020 | Zhang | G06N 3/049 |
| 2020/0302637 | A1* | 9/2020 | Kobayashi | G06V 20/10 |
| 2020/0334457 | A1* | 10/2020 | Wang | G06V 10/454 |
| 2020/0372243 | A1* | 11/2020 | Tai | G06V 40/171 |
| 2020/0380168 | A1* | 12/2020 | Klinkigt | G06K 9/6267 |
| 2020/0410297 | A1* | 12/2020 | Willers | G06N 3/04 |
| 2021/0089794 | A1* | 3/2021 | Chen | G06K 9/6256 |
| 2021/0089827 | A1* | 3/2021 | Kumagai | G06K 9/6253 |
| 2021/0089841 | A1* | 3/2021 | Mithun | G06V 10/82 |
| 2021/0224600 | A1* | 7/2021 | Toizumi | G06K 9/6257 |
| 2021/0232847 | A1* | 7/2021 | Yue | G06V 20/56 |
| 2021/0266565 | A1* | 8/2021 | Zhou | G06N 5/04 |
| 2021/0295089 | A1* | 9/2021 | Wang | G06K 9/628 |
| 2021/0303903 | A1* | 9/2021 | Watanabe | G06V 30/2504 |
| 2021/0365716 | A1* | 11/2021 | Li | H04N 5/247 |
| 2021/0366161 | A1* | 11/2021 | Wong | G06N 3/084 |
| 2021/0383166 | A1* | 12/2021 | Nie | G06K 9/6268 |
| 2021/0406582 | A1* | 12/2021 | Wang | G06V 10/50 |
| 2021/0406596 | A1* | 12/2021 | Hoffman | G06K 9/6261 |
| 2021/0406600 | A1* | 12/2021 | Chae | G06T 7/70 |
| 2022/0019870 | A1* | 1/2022 | Gu | G06N 3/04 |
| 2022/0157048 | A1* | 5/2022 | Ting | G06N 3/084 |
| 2022/0180624 | A1* | 6/2022 | Li | G06V 10/82 |

\* cited by examiner

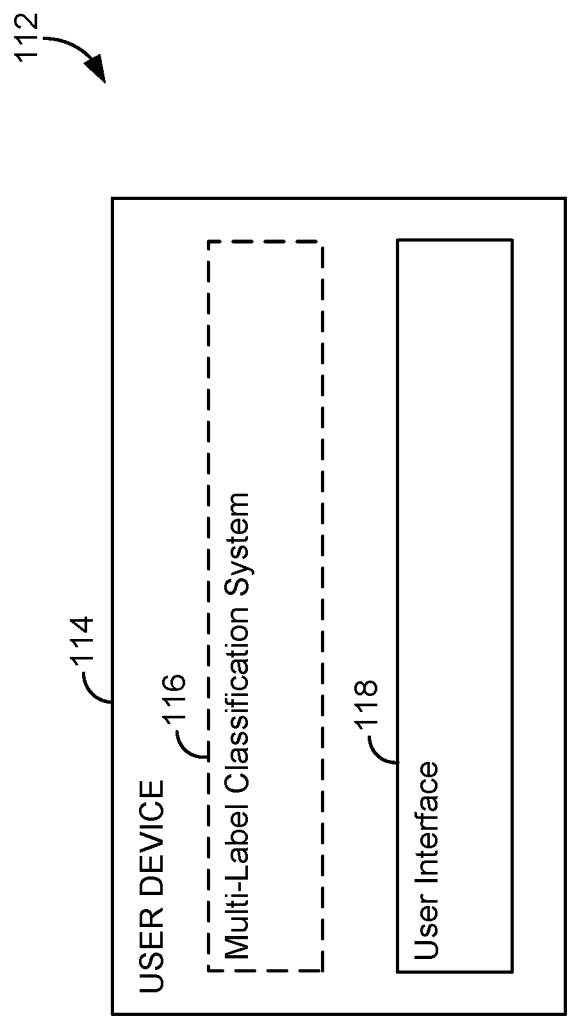

DECOUPLING CATEGORY-WISE INDEPENDENCE AND RELEVANCE WITH SELF-ATTENTION FOR MULTI-LABEL IMAGE CLASSIFICATION

BACKGROUND

Images typically contain multiple features. For instance, in a landscape, the image can depict grass, sky, mountains, trees, etc. Oftentimes, it is desirable for a classification system to identify multiple labels that relate to the various features depicted in an image. However, creating a classification system that can accurately identify multiple labels related to an image is a challenging task. Typically, conventional classification systems that attempt to perform multi-label classification merely implement multiple binary classifications related to each label. Conventional systems have attempted to train an end-to-end convolutional neural network to perform multi-label classification. Such a conventional convolutional neural network typically extracts features and then trains a number of binary classifiers (e.g., based on class). Improvements have attempted to incorporate correlations between different classes during multi-label classification. In particular, conventional methods have used convolutional filters in an attempt to learn implicit relationships between classes. However, applying convolutional filters to conventional convolutional neural networks that try to implicitly learn relationships between classes often results in difficulties during the training process (e.g., based on information redundancies). As a result, a convolutional neural network trained using such conventional techniques can inaccurately identify labels for an image.

SUMMARY

Embodiments of the present disclosure are directed to multi-label classification system. Advantageously, the multi-label classification system explicitly takes into account the relationship between classes (e.g., based on the features of an image) when identifying labels. One method described herein for creating such a system is using a neural network (s). Such a multi-label classification system can be implemented using one or more neural networks (e.g., a multi-label classification neural network system comprising a feature extraction neural network, a main classification neural network, and a relevance sub-network). In embodiments, the multi-label classification system can implement a feature extraction neural network to extract features of interest from an image. The multi-label classification system can further implement a main classification neural network along with a relevance sub-network to identify one or more labels for an image. In particular, the multi-label classification system can receive an image and identify one or more labels related to features of the image. In some embodiments, the multi-label classification system can receive an image and generate one or more heat maps related to features of the image.

BRIEF DESCRIPTION OF THE DRAWINGS

FIG. 1B depicts an example configuration of an operating environment in which some implementations of the present disclosure can be employed, in accordance with various embodiments.

DETAILED DESCRIPTION

Figure 1A:
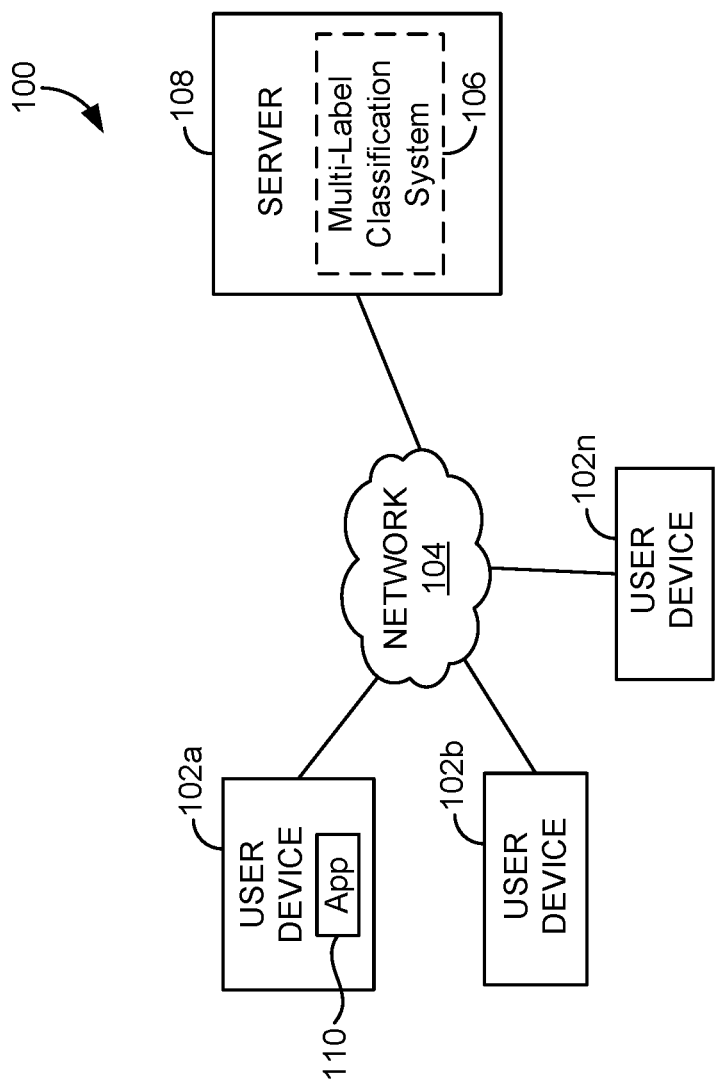
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Automated identification of features depicted in an image is often a desired functionality. Typically, images contain more than one feature. A convolutional neural network can be trained using conventional techniques in an attempt to identify these multiple features. Such conventional approaches can use a number of binary classifiers for identification of the multiple features (e.g., where each binary classifier is associated with one of the multiple features). Some approaches have added convolutional filters to a convolutional neural network in an attempt to learn relationships between features. However, conventional methods for identifying multiple features using a convolutional neural network with convolutional filters merely learn implicit relationships between features. For instance, such conventional methods can incorporate class relevance using filters applied to a single class in relation to an output instead of focusing on correlations between classes.

Accordingly, at a high level, embodiments of the present disclosure are directed to facilitating the creation and utilization of a multi-label classification system with explicitly learned relationships between classes of features. The multi-label classification system can determine features in an image and identify corresponding labels for the image. Advantageously, the multi-label classification system explicitly takes into account the relationship between classes (e.g., based on the features of an image) when identifying labels. The multi-label classification system is further advantageous because it can learn strong relationships between classes without adding unnecessary redundancies in information. In addition, the multi-label classification system is capable of generating visualizations mapping identified labels to the image (e.g., heat maps based on the location of the features).

Such a multi-label classification system can be implemented using one or more neural networks (e.g., a multi-label classification neural network system comprising a feature extraction neural network, a main classification neural network, and a relevance sub-network). A neural network generally refers to a computational approach using large clusters of connected neurons. Neural networks are self-learning and trained rather than explicitly programmed such that a generated output of a neural network reflects a desired result. As described herein, the multi-label classification system can implement a feature extraction neural network to extract features of interest from an image. The multi-label classification system can also implement a main classification neural network along with a relevance sub-network to identify one or more labels for an image. The main classification neural network can be an end-to-end modified convolutional neural network framework. The relevance sub-network can include a convolutional neural network with an attention layer.

The multi-label classification system can be implemented as a multi-label classification neural network system. In embodiments, the multi-label classification neural network system can be comprised of the feature extraction neural network, the main classification neural network, and the relevance sub-network. The multi-label classification neural network system can be used to decouple class independence and category-wise relevance in features extracted from an image. Decoupling can allow for class independence and category-wise relevance to work collaboratively in the multi-label training process. For instance, class independence can focus learning on spatial details related to a particular class. In instances, a category-wise space-to-depth module can be integrated into the multi-label classification neural network system (e.g., into the main classification neural network). The category-wise space-to-depth module can be used to preserve detailed features and enhance class independence in the multi-label classification neural network system (e.g., into the main classification neural network). The multi-label classification neural network system can also learn multiple feature maps for each class (e.g., to learn spatial details) by jointly applying upsampling and channel-wise convolution (e.g., using the main classification neural network). Category-wise relevance, on the other hand, can focus on learning the relationships across categories (e.g., across all classes). A self-attention mechanism of the multi-label classification neural network system can be used to integrate the category-wise relevance (e.g., from the relevance sub-network) into the class independence (e.g., from main classification neural network).

As described herein, the multi-label classification neural network system can be implemented to perform the task of multi-label classification. In particular, the multi-label classification neural network system can receive an image and generate an output that indicates one or more labels for the image. To implement the system, in some embodiments, a feature extraction neural network can extract features of interest from an image. In some instances, the feature extraction neural network can be a pre-trained convolutional neural network (e.g., trained to extract features of interest from an input image). Features extracted from the image can be represented using one or more convolutional feature maps. In other embodiments, to implement the system, a main classification neural network can receive a representation of an image (e.g., one or more convolutional feature maps). In some instances, the representation of the image can be received from the feature extraction neural network. The main classification neural network can transform the convolutional features of the image into class-based features (e.g., class-wise feature maps) to enhance independence and discriminative power related to the features. A relevance sub-network can be trained alongside the main classification neural network to explicitly learn relationships between classes of features. Classes of features can relate to the labels that can be output by the multi-label classification neural network system. Using landscape photos as an example, classes (and corresponding labels) can include the following: grass, house, buildings, valley, lake, water, sky, person, remote, tower, clouds, etc.

In further detail, to implement the multi-label classification neural network system, an image can be input into the multi-label classification neural network system. Upon receiving the image, in some embodiments, the image can be run through a pre-trained convolutional neural network to extract convolutional feature maps from the input image. These convolutional feature maps can then be input into the main classification neural network. The main classification neural network can receive convolutional feature maps representative of an image (e.g., convolutional feature maps from the feature extraction neural network). The main classification neural network can encode these convolutional feature maps into class-wise features. For instance, the convolutional feature maps can be encoded into different channels based on a class related to a feature of a convolutional feature map (e.g., a convolutional feature map corresponding to a feature of a dog can relate to the class: dog). In this way, each channel can relate to a particular class and can preserve spatial details for the class related to the channel (e.g., a dog channel can relate to the class: dog).

In some embodiments, the convolutional feature maps of the channels can be upsampled to emphasize spatial details. For instance, to emphasize spatial details the spatial resolution of convolutional feature maps be increased. Advantageously, increasing the spatial resolution can preserve more localized detailed information. As an example, in an image depicting a person holding a small remote, upsampling the image can increase the spatial resolution of the convolutional feature map corresponding to the small (e.g., localized) area showing the remote.

In instances, a class-wise space-to-depth encoder structure of the multi-label classification neural network system can be used to ensure that class-wise features are learned for each specific channel. An encoding operation of the class-wise space-to-depth encoder can be used to transform spatial information from an upsampled convolutional feature map into multiple class-wise feature maps. Transforming the spatial information into multiple class-wise feature maps can result in each class-wise feature map representing a different spatial feature. In embodiments, the class-wise space-todepth encoder can generate a set of class-wise feature maps for each channel. In some instances, such an encoder can also reduce the spatial size of each feature (e.g., back to the spatial resolution of the initial convolutional feature maps).

The sets of class-wise feature maps can be combined into a category-wise feature map. The sets of class-wise feature maps can include each set of class-wise feature maps generated for each channel (e.g., based on the upsampled convolutional feature map of each channel). Max-pooling can be used to combine the sets of class-wise feature maps. In embodiments, category-wise max-pooling can be used to combine the discriminative information from the sets of class-wise feature maps. In combining the sets of class-wise feature maps (e.g., using max-pooling), a single representation can be generated. Such a single representation can be a category-wise feature map. For instance, the combined class-wise feature maps (e.g., category-wise feature map) can be represented, for example, using a matrix.

In embodiments, the system can use a relevance sub-network of the multi-label classification neural network system to explicitly learn relevance between classes. In particular, the relevance sub-network can decouple independence between classes to focus learning on relevance between the classes. Advantageously, the relevance sub-network can adaptively model class-wise relevance during training of the multi-label classification neural network system without additional explicit supervision. The relevance sub-network of the multi-label classification neural network system can learn relevance between classes using feature maps. In one embodiment, relevance can be directly learned from class-wise feature maps. Such a class-wise feature map can be class-independent (e.g., related to a single class). Learning relevance directly from class-wise feature maps can allow the relevance sub-network to learn class relevance information from class-independent features. Learning relevance directly from class-wise feature maps can be advantageous because such relevance can efficiently compensate for class-independent features. In another embodiment, relevance can be learned from convolutional feature maps (e.g., from the feature extraction neural network). Learning relevance from convolutional feature maps can allow the relevance sub-network to preserve more local detailed information when learning relevance. In embodiments, the relevance sub-network can be comprised of an attention layer comprised of a 1×1 convolutional layer, a batch normalization layer, and a max-pooling layer.

The relevance sub-network represents explicitly learned relevance using a dynamic re-weighting. Dynamic re-weighting can be automatically learned as the multi-label classification neural network system undergoes training. Such a dynamic re-weighting can be represented as channel-wise attention maps. Attention maps can model the interdependencies between different channels (e.g., indicating different classes).

The relevance sub-network can apply the explicitly learned relevance using a dynamic re-weighting operation. Such a dynamic re-weighting operation can be based on integrating the channel-wise attention maps with the category-wise feature map of the main classification neural network. In embodiments, the channel-wise attention maps can be coupled with the category-wise feature map to incorporate explicitly learned relevance between classes. Coupling can be performed, for example, using an encoder. In embodiments, a residual connection can be used to encode the channel-wise attention maps into the category-wise feature map (e.g., the category-wise feature map comprised of the combined class-wise convolutional feature maps learned by the main classification neural network). In this way, the channel-wise attention maps can be used to dynamically re-weight the class-wise convolutional feature maps of the category-wise feature map.

An output can be identified based on the coupled category-wise feature map with the channel-wise attention maps. The output can indicate a probability that a label should be assigned to an input image. For example, the output can indicate a probability score based on each class. In some embodiments, probability scores (e.g., for all classes) can be represented using a vector. Such a vector can have C dimensions, where C is the number of classes analyzed by the multi-label classification neural network system.

To train such a multi-label classification neural network system, a database of images with known labels can be used. In a training iteration, an image can be input into the network such that the network learns to output one or more labels for the input image. Errors in the output labels generated by the network can be determined such that the errors can be fed back through the network to appropriately train the network. Errors can be determined by comparing an output from the neural network against a ground-truth output. In embodiments, error(s) can be determined using binary cross-entropy loss. Ground-truth generally refers to an expected output based on a specific input that a neural network should generate when the network correctly labels an image (e.g., correctly performs multi-label classification). Upon determining errors in the network during an iteration of training a network based on the ground-truth comparison, the errors can be used to adjust the weight of network parameters to reduce the value of the error. In this way, the network architecture can remain the same during training iterations, but the weights of the network parameters can be retrained (e.g., updated) during an iteration of training to reduce errors.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 900 described in connection to FIG. 9, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 9. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out multi-label classification for an image. In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 110 can facilitate multi-label image classification. In some cases, a user can select or input an image. An image can be selected or input in any manner. For example, a user may take a picture using a camera function on a device. As another example, a user may select a desired image from a repository, for example, stored in a data store accessible by a network or stored locally at the user device 102a. In other cases, an image may be automatically selected or detected (e.g., from a webpage or augmented reality environment). Based on the input image, (e.g., provided via a user device or server), multi-label image classification can be performed and one or more labels (or other identifier) identified for the input image can be provided, for example, to the user via the user device 102a. In this regard, the one or more labels from the multi-label image classification can be displayed via a display screen of the user device. In some instances, visualizations can be provided as heat maps related to features in an image (e.g., based on mapping of category-wise feature maps). As can be appreciated, in some cases, additionally or alternatively, the one or more labels may not be presented but rather utilized (e.g., by a service) to provide other information or perform a function.

Application 110 can facilitate multi-label image classification for various purposes. Such purposes can include auto-semantic-labeling for images, semantic search, inventory management, and/or supervised learning. For example, in one embodiment, application 110 can be used to recognize various attributes of a product (e.g., color, shape, size, etc.). As a further example, application 110 can be used to perform auto-labeling for training images that can be used for supervised learning. Such auto-labeling can be advantageous in that it can save time and energy expended during manual labeling. In still another example, application 110 can be used for inventory management. In inventory management, multiple labels can be identified for articles of clothing. Such labels then be used to sort the clothing into various categories that can be used to manage inventory efficiently. Such purposes can further include security applications such as location and tracking. For example, in one embodiment, application 110 can be used for recognizing multiple characteristics of a person. Such characteristics can include, for instance, face, body shape, hair length (e.g., long hair, short hair), clothing type (e.g., skirt, pants, etc.), other items (e.g., backpack, suitcase, purse, etc.). Such identified characteristics can then be used to precisely locate and/or track a person in a crowd (e.g., market, train station, airport, stadium, etc.). Still further, such purposes can include can an expert recommendation system (e.g., based on fashion research). For example, in one embodiment, application 110 can be used for making product recommendations (e.g., recommending similar products based on what a customer is wearing or based on a picture uploaded by a customer). As another example, application 110 can be used for fashion trend analysis (e.g., determining a popular color by analyzing labels generated images relevant to a particular fashion trend). It should be appreciated that such uses of a multi-classification system can be implemented by multi-label classification system 106 without the use of application 110.

As described herein, server 108 can facilitate multi-label image classification for an image via multi-label classification system 106. Server 108 includes one or more processors, and one or more computer-readable media. The computer-readable media includes computer-readable instructions executable by the one or more processors. The instructions may optionally implement one or more components of multi-label classification system 106, described in additional detail below.

Multi-label classification system 106 can train and operate a neural network system in order to perform multi-label classification. Such a neural network system can be comprised of one or more neural networks that are trained to generate a designated output. For example, a neural network system can utilize a modified encoder-decoder framework. The multi-label classification system is discussed in further detail with reference to FIG. 2.

In implementations (e.g., cloud-based implementations), the instructions on server 108 may implement one or more components of multi-label classification system 106, and application 110 may be utilized by a user to interface with the functionality implemented on server(s) 108. In some cases, application 110 comprises a web browser. In other cases, server 108 may not be required. For example, the components of multi-label classification system 106 may be implemented completely on a user device, such as user device 102a. In this case, multi-label classification system 106 may be embodied at least partially by the instructions corresponding to application 110.

Thus, it should be appreciated that multi-label classification system 106 may be provided via multiple devices arranged in a distributed environment that collectively provide the functionality described herein. Additionally, other components not shown may also be included within the distributed environment. In addition, or instead, multi-label classification system 106 can be integrated, at least partially, into a user device, such as user device 102a. Furthermore, multi-label classification system 106 may at least partially be embodied as a cloud computing service.

Referring to FIG. 1B, aspects of an illustrative multi-label classification system are shown, in accordance with various embodiments of the present disclosure. FIG. 1B depicts a user device 114, in accordance with an example embodiment, configured to allow for identifying one or more labels for an image using a multi-label classification system. The user device 114 may be the same or similar to the user device 102a-102n and may be configured to support the multi-label classification system 116 (as a standalone or networked device). For example, the user device 114 may store and execute software/instructions to facilitate interactions between a user and the multi-label classification system 116 via the user interface 118 of the user device.

A user device can be utilized by a user to perform multi-label classification system. In particular, a user can select and/or input an image to label utilizing user interface 118. An image can be selected or input in any manner. The user interface may facilitate the user accessing one or more stored images on the user device (e.g., in a photo library), and/or import images from remote devices and/or applications. As can be appreciated, images can be input without specific user selection. Based on the input and/or selected image, multi-label classification system 116 can be used to perform multi-label classification of the image using various techniques, some of which are further discussed below. User device 114 can also be utilized for displaying the multi-label classified image (e.g., using labels, tags, maps, etc.).

Figure 2:
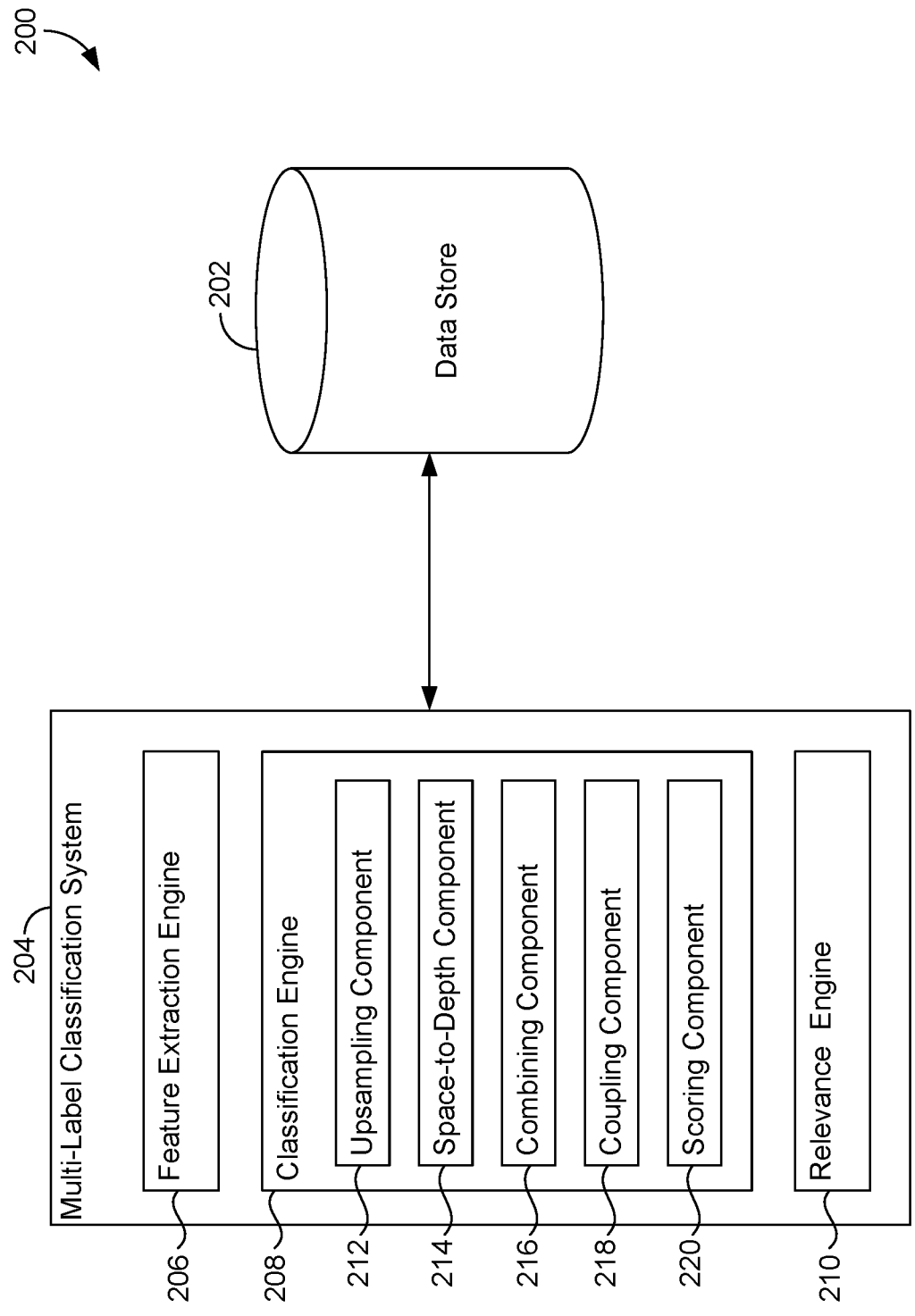
FIG. 2 depicts an example configuration of an operating environment in which some implementations of the present disclosure can be employed, in accordance with various embodiments of the present disclosure.

Referring to FIG. 2, aspects of an illustrative environment 200 are shown, in accordance with various embodiments of the present disclosure. Multi-label classification system 204 can include feature extraction engine 206, classification engine 208, and relevance engine 210. The foregoing engines of multi-label classification system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the multi-label classification system.

As shown, a multi-label classification system can operate in conjunction with data store 202. Data store 202 can store computer instructions (e.g., software program instructions, routines, or services), data, and/or models used in embodiments described herein. In some implementations, data store 202 can store information or data received via the various engines and/or components of multi-label classification system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally). In embodiments, data stored in data store 202 can include images used for training multi-label classification system. Such images can be input into data store 202 from a remote device, such as from a server or a user device.

In embodiments, data stored in data store 202 can include a dataset used for training a multi-label classification system. Such a dataset can be split into training data (e.g., a training set) and validation data (e.g., a validation set). The training data generally refers to data used to train a multi-label classification system, or portion thereof. The validation portion can generally be used to validate a multi-label classification system. Validation can indicate whether there is an error in labeling an image when running the multi-label classification system.

In some cases, data can be received by multi-label classification system 204 from user devices (e.g., from user device 202a or another device associated with a user, via, for example, application 210). In other cases, data can be received from one or more data stores in the cloud. In yet other cases, data can be received from a server. Data store 202 can also be used to store a trained neural network system (e.g., multi-label classification neural network system) used to implement the multi-label classification system.

Multi-label classification system 204 can generally be used for labeling images using multi-label classification. In embodiments, the multi-label classification system can use one or more neural networks. A neural network can comprise a plurality of interconnected nodes with a parameter, or weight, associated with each node. Each node can receive inputs from multiple other nodes and can activate based on the combination of all these inputs, for example, when the sum of the input signals is above a threshold. The parameter can amplify or dampen the input signals. For example, a parameter could be a value between 0 and 1. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation. These parameters can be determined during training of the neural network.

Feature extraction engine 206 can be used to determine convolutional feature maps for an image. In embodiments, feature extraction engine can utilize a feature extraction neural network to determine convolutional feature maps for an input image. Such a feature extraction neural network can be a convolutional neural network. A convolutional neural network can be comprised of a number of convolutional and subsampling layers optionally followed by fully connected layers. Such a convolutional neural network can be used to extract features of interest from an input image. In extracting features from the image, one or more convolutional feature maps corresponding to the features of interest can be generated. In some instances, the feature extraction neural network can be a pre-trained network (e.g., a pre-trained convolutional neural network for extracting features from images).

In an embodiment, convolutional layers of a convolutional neural network can be used to extract features. For example, convolutional layers of the convolutional neural network can act as feature extraction layers. Convolutional layers can apply multiple filters, each of which can output a feature mapping of an input. Such feature mapping can signify spatial locations where a feature is present. Inputs and outputs to convolutional layers can be convolutional feature maps represented, for example, using a matrix. The dimension of the matrix can be M×H×W, where M is the number of convolutional feature maps, H is the height, and W is the width. In instances, at a first convolutional layer the input can be the raw image pixel values. The filter layers can consist of multiple trainable kernels, which can be convolved with the input to the convolution layer, with each feature map. Each of the kernels can detect a particular feature at every location on the input. The filters can give rise to a locally connected structure which are each convolved with the image to produce convolutional feature maps. As an example, produced convolutional feature maps can be represented using a matrix. Such a matrix can have the dimensions M×H'W.

Classification engine 208 can be used to train and/or implement a main classification neural network. The main classification neural network can be capable of enhancing class-independent features from convolutional feature maps (e.g., from the feature extraction neural network). A main classification neural network can be trained to learn class-independent features with image-level supervision (e.g., using the main classification neural network run in conjunction with a relevance sub-network that can learn to correlate relationships between classes). The main classification neural network can encode convolutional feature maps (e.g., from the feature extraction neural network) into class-wise features that can be used for classification. Such a main classification neural network can be comprised of an upsampling layer, a class-independent multi-map learning layer, and a category-wise max-pooling layer.

Classification engine 208 can generally be used to implement the main classification neural network of the multi-label classification neural network system. As depicted, classification engine 208 may include upsampling component 212, space-to-depth component 214, combining component 216, coupling component 218, and scoring component 220. The foregoing components of classification engine 208 can be implemented, for example, in operating environment 100 of FIG. 1A and/or operating environment 112 of FIG. 1B. In particular, these components may be integrated into any suitable combination of user devices 102a and 102b through 102n and server(s) 106 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the classification engine.

Convolutional feature maps can be input into the main classification neural network. In some embodiments, the convolutional feature maps (e.g., from the feature extraction neural network) can be input into the main classification neural network as separate channels. For instance, convolutional feature maps can be encoded into C channels. Each channel can be related to a particular class of the multi-label classification neural network system. A class can be related to a feature of an image (e.g., grass, house, buildings, valley, lake, water, sky, person, remote, tower, clouds, etc.). In this way, each channel can be used to relate to and preserve spatial details for the class of the channel.

Upsampling component 212 can be used to emphasize details of convolutional feature maps. Details of the convolutional feature maps can be emphasize by increasing the spatial resolution of convolutional feature maps. Increasing the spatial resolution of convolutional feature maps can preserve more localized detailed information. As an example, in an image depicting a person holding a small remote, upsampling the image can increase the spatial resolution of the convolutional feature map corresponding to the small (e.g., localized) area showing the remote. In embodiments, the convolutional feature maps can be upsampled using a 3×3 transposed convolutional kernel.

Space-to-depth component 214 can be used to further enhance class-wise independence. In embodiments, a class-wise space-to-depth encoder structure can be used for further enhancement. Using a class-wise space-to-depth encoder can ensure that class-wise features are learned for each specific channel. In this way, the encoding operation can transform the spatial information from an upsampled convolutional feature map into multiple class-wise feature maps. In this way, each class-wise feature map can represent a different spatial feature. In embodiments, such an encoder can also reduce the spatial size of each feature (e.g., such that each class-wise feature map has the same spatial size). For example, a 3×3 channel-wise group convolution can be used to encode an upsampled channel (e.g., upsampled convolutional feature map) into multiple class-wise feature maps (e.g., m class-wise feature maps). Each channel can have a set of class-wise feature maps generated from an upsampled convolutional feature map.

Combining component 216 can be used to combine the information from class-wise feature maps. In embodiments, category-wise max-pooling can be used to combine discriminative information among m class-wise feature maps. The combining component can combine the class-wise feature maps into a single representation. Such a single representation can be a category-wise feature map. For instance, combined class-wise feature maps can be represented, for example, using a matrix. The dimension of the matrix can be C×H×W, where C is the number of channels, H is the height, and W is the width.

Coupling component 218 can be used to couple information learned from the convolutional feature maps using the multi-label classification neural network with information learned about relationships between classes. Information about relationships between classes can be learned using, for example, a relevance sub-network. Such a relevance sub-network is discussed in more detail with reference to relevance engine 210.

Relevance engine 210 can be used to run a relevance sub-network that can learn to correlate relationships between classes with a given output. In instances, the relevance sub-network can decouple independence and relevance between classes. For example, in an embodiment, relevance can be directly learned from class-wise feature maps. Such a class-wise feature map can be class-independent. Learning relevance directly from class-wise feature maps can allow the relevance sub-network to learn class relevance information from class-independent features. Learning relevance directly from class-wise feature maps can be advantageous because such relevance can efficiently compensate for class-independent features. In another embodiment, relevance can be directly learned from convolutional feature maps (e.g., from the feature extraction neural network). Learning relevance from convolutional feature maps can allow the relevance sub-network to preserve more local detailed information in the multi-label classification neural network.

The relevance sub-network can be used to apply a dynamic re-weighting operation using automatically learned channel-wise attention maps. Such a relevance sub-network can apply a re-weighting operation without the need for additional supervision. For instance, the relevance sub-network can adaptively model class-wise relevance without additional explicit supervision. In embodiments, the relevance sub-network can include an attention layer that models interdependencies between different channels (e.g., indicating different categories). For example, the relevance sub-network can be an attention layer comprised of a 1×1 convolutional layer, a batch normalization layer, and a max-pooling layer. For instance, the max-pooling layer can use global max-pooling with Sigmoid to learn channel-wise attention maps.

In instances, coupling component 218 can couple channel-wise attention maps (e.g., from a relevance sub-network) with convolutional feature maps (e.g., from a main classification neural network). Coupling can be performed, for example, using an encoder. A residual connection can be used to encode learned channel-wise attention maps into the convolutional feature maps learned by the main classification neural network. For instance, the channel-wise attention maps can be encoded with the category-wise feature map of the combined class-wise feature maps (e.g., represented as a C×H×W matrix). An example equation for coupling channel-wise attention maps with the category-wise feature map can be as follows: for input feature maps, $X_{in}$ (e.g., convolutional feature maps or class-wise feature maps), $$attn = U(X_{in}; W), attn \in \mathbb{R}^{C \times 1 \times 1}$$

$$X_{coupled} = (1+attn) \cdot Z, X_{coupled} \in \mathbb{R}^{C \times 14 \times 14}$$

In such a representation, $U(\cdot)$ can be the attention layer (e.g., a relevance sub-network). $X_{coupled}$ can be the combined class-wise feature maps coupled with the learned channel-wise attention maps. Z can be the feature learned by the multi-label classification neural network.

Scoring component 220 can be used to determine probability scores for each class. In embodiments, the scoring component can use the reweighted category-wise feature maps (e.g., reweighting based on coupling with the learned channel-wise attention maps) to determine how likely a label should be assigned to an input image. For example, a probability score can be determined for each class. Such probability scores can be represented using a vector. Such a vector can have C dimensions, where C is the number of classes analyzed by the multi-label classification neural network.

In embodiments, to obtain the probability scores for each class, spatial pooling can be used. Spatial pooling can integrate capabilities of both max-pooling and global average pooling. For instance, spatial pooling can use optimal hyperparameters to average positive and negative pixels in each reweighted category-wise feature map. An example equation that can be used for spatial pooling is as follows:

$$s^c = \frac{1}{k^+} \sum_{topk^+ p_{i,j}^c} p_{i,j}^c + \alpha \frac{1}{k^-} \sum_{topk^- p_{i,j}^c} p_{i,j}^c$$

In such an equation, $s^c$ can be the score of a channel c (e.g., class). $p_{i,j}^c$ can be the pixel of the c-th feature map $X_{coupled}$. $k^+$ can be the number of pixels with highest values and $k^-$ can be the number of pixels with the lowest values. In some instances, a Sigmoid layer can be applied to such an equation to obtain final probability scores for each class. Applying a Sigmoid layer can ensure that the final probability score for each class has a value between 0 and 1. To determine whether a label corresponding to a class should be reported, a threshold level can be set (e.g., 0.5, 0.75, 0.8). In embodiments, the threshold level can be set to 0.5. In such an embodiment, a label can be reported with the final probability score for that class is greater than or equal to 0.5.

To train such multi-label classification neural network, a database of images with known labels can be used. In a training iteration, an image can be input into the network such that the network learns to output one or more labels for the input image. Errors in the output labels generated by the network can be determined such that the errors can be fed back through the network to appropriately train the network. Errors can be determined by comparing an output from the neural network against a ground-truth output. In embodiments, errors can be determined using binary cross-entropy loss. Ground-truth generally refers to an expected output based on a specific input that a neural network should generate when the network correctly labels an image (e.g., correctly performed multi-label classification). Upon determining errors in the network during an iteration of training a network based on the ground-truth comparison, the errors can be used to adjust the weight of network parameters to reduce the value of the error. In this way, the network architecture can remain the same during training iterations, but the weights of the network parameters can be retrained (e.g., updated) during an iteration of training to reduce errors.

Figure 3:
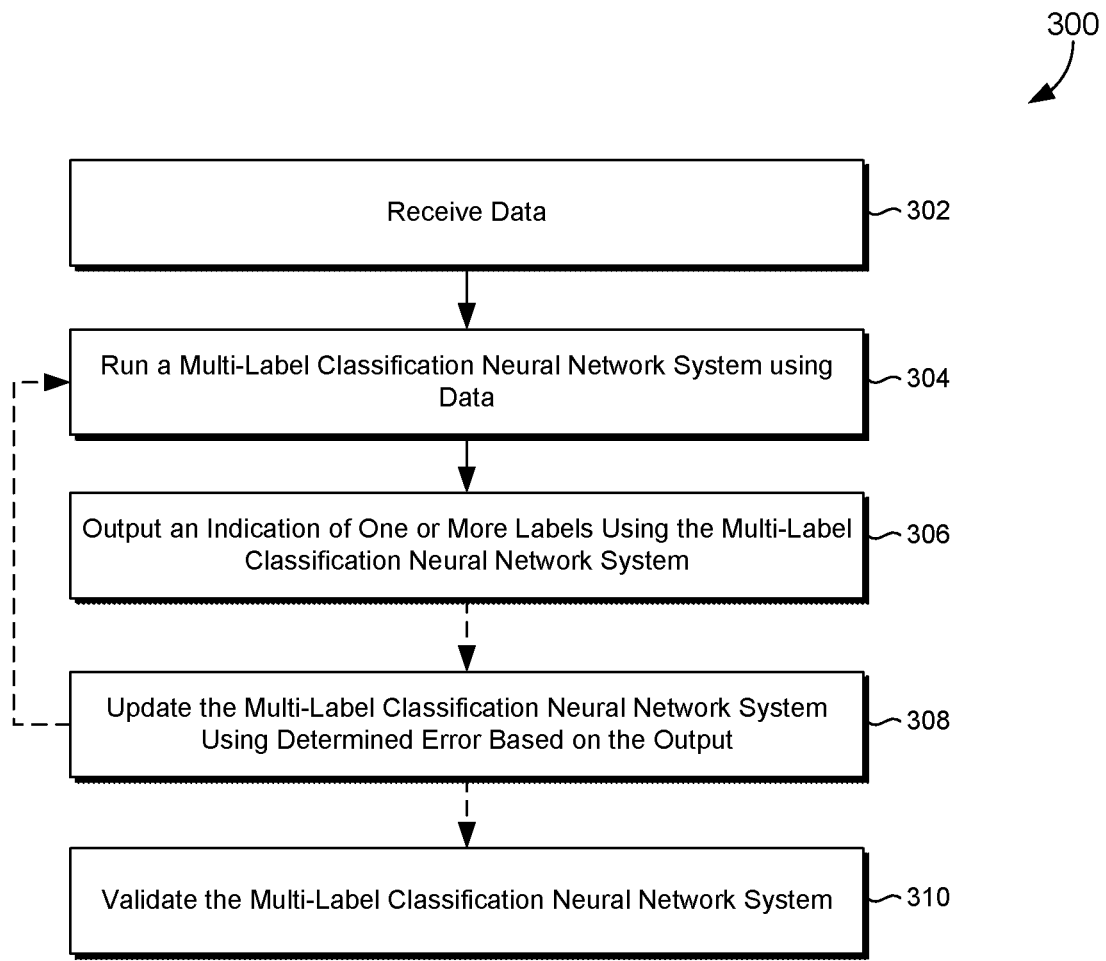
FIG. 3 depicts a process flow showing an embodiment for training and/or utilizing a multi-label classification system, in accordance with embodiments of the present disclosure.

With reference to FIG. 3, a process flow is provided showing an embodiment of method 300 for training and/or utilizing a multi-label classification system, in accordance with embodiments of the present disclosure. Aspects of method 300 can be performed, for example, by feature extraction engine 206, classification engine 212, and/or relevance engine 216, as discussed with reference to FIG. 2.

At block 302, data can be received. In some embodiments, the data can be received from an online depository. In other embodiments, the data can be received from a local system. Such received data can be selected or input into the multi-label classification system in any manner (e.g., by a user). For example, a user can access one or more stored images on a device (e.g., in a photo library) and select an image from remote devices and/or applications for import into the multi-label classification system.

In some instances, received data can be data used to train the multi-label classification neural network system. Such data can include images and corresponding ground truth label(s). Ground-truth generally refers to an expected output based on a specific input that a neural network should generate when the network is correctly predicting labels. Images and ground truth labels can be received from one or more databases used for training classification systems (e.g., MS-COCO dataset or NUS-WIDE dataset). In embodiments, the data can include training data and validation data.

Training data generally refers to data used to train a multi-label classification neural network system of the multi-label classification system, or a portion thereof. The validation data can generally be used to validate (e.g., check accuracy) the multi-label classification neural network system of the multi-label classification system, or a portion thereof. As such, the data can be split into a training data and a validation data.

In other instances, received data can be data used to implement a trained multi-label classification neural network system. Such data can include an image (e.g., for multi-label classification).

At block 304, a multi-label classification neural network system can be run using data. The data can be, for example, the data received at block 302. In an embodiment where the multi-label classification neural network system is undergoing training, the data can be data for training the system (e.g., images and ground truth labels). In an embodiment where a trained multi-label classification neural network system is being implemented, the data can be data for classification (e.g., an image for multi-label classification). For instance, the data can be an image input into the multi-label classification system to undergo multi-label classification.

In an embodiment, to run the multi-label classification neural network system during training, an image from training data can be input such that the network learns to outputs an indication of one or more labels at block 306. The indication of one or more labels can be represented using, for example, a probability score for each class recognized by the multi-label classification neural network system. In instances, probability scores can be represented using a vector. Such a vector can have C dimensions, where C is the number of classes analyzed by the multi-label classification neural network.

In embodiments during training, the method can proceed to block 308. At block 308, the multi-label classification neural network system can be updated using determined error. Errors in the output (e.g., indication of one or more labels) can be fed back through the network to appropriately train the network. Errors can be determined by comparing an output from the neural network against a ground-truth output. In embodiments, errors can be determined using binary cross-entropy loss. Upon determining errors in the network during an iteration of training a network based on the ground-truth comparison, the errors can be used to adjust the weight of network parameters to reduce the value of the error.

In some instances, the method can proceed to block 310 to validate the multi-label classification neural network system. To validate the trained multi-label classification neural network system, the system can be evaluated for accuracy. Validation data can generally be used to evaluate the accuracy (e.g., validate) of the trained multi-label classification neural network system. Validation can be used be performed using an image from the validation data (e.g., an image not previously labeled by the system). In this way, validation can indicate whether there are errors in performing multi-classification labeling.

In some embodiments, upon completion of training and validation of the multi-label classification neural network system, the system can be utilized to output an indication of one or more labels for an image, at block 306. For instance, upon receiving an image, the trained and validated multi-label classification neural network system can be run to identify probability scores for each class in relation to the image. To determine whether a label corresponding to a class should be reported (e.g., output), a threshold level can be set based on the probability scores for the classes (e.g., 0.5, 0.75, 0.8). In embodiments, the threshold level can be set to 0.5. In such an embodiment, a label can be reported with the final probability score for that class is greater than or equal to 0.5.

Figure 4:
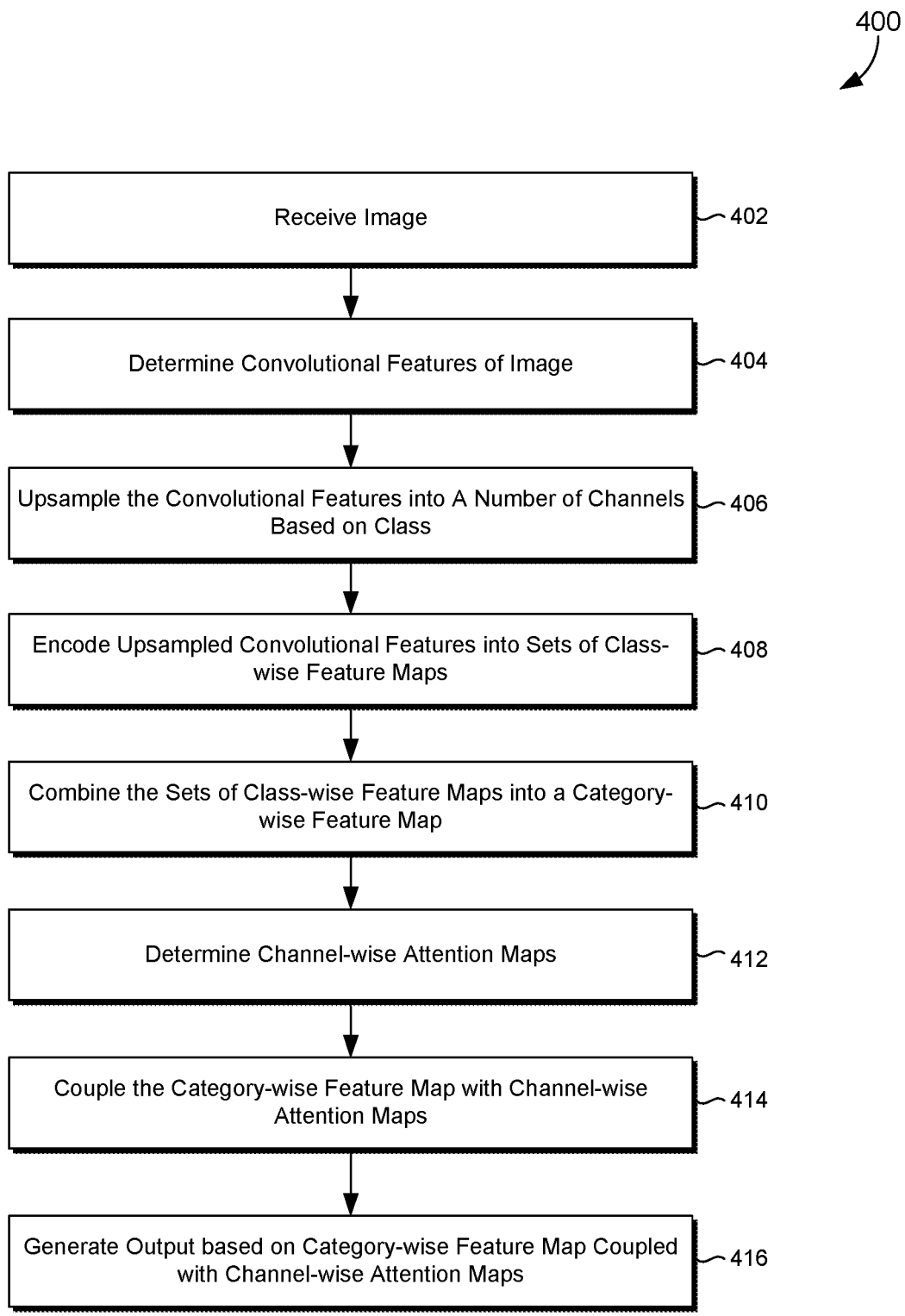
FIG. 4 depicts a process flow showing an embodiment for implementing a multi-label classification neural network system to identify labels for an image, in accordance with embodiments of the present disclosure.

With reference to FIG. 4, a process flow is provided showing an embodiment(s) of method 400 for implementing a multi-label classification neural network system to identify labels for an image, in accordance with embodiments of the present disclosure. Aspects of method 400 can be performed, for example, by multi-label classification system 204, as illustrated in FIG. 2.

At block 402, an image can be received. In some embodiments, the image can be received from an online depository. In other embodiments, the image can be received from a local system. Such a received image can be selected or input into the multi-label classification system in any manner (e.g., by a user). For example, a user can access one or more stored images on a device (e.g., in a photo library) for input into the multi-label classification system. As another example, a user can select an image from remote devices and/or applications for import into the multi-label classification system. As can be appreciated, images can also be input without specific user selection.

At block 404, convolutional features can be determined for an image (e.g., the image received at block 402). Such convolutional features can be represented using one or more convolutional feature maps. The convolutional features can be determined using a feature extraction neural network (e.g., feature extraction engine 206). Such a feature extraction neural network can be a pre-trained convolutional neural network for determining convolutional features from images.

At block 406, the convolutional features can be upsampled into a number of channels based on class. Upsampling the convolutional features can be used to emphasize details of the convolutional features. Upsampling can be performed by increasing the spatial resolution of convolutional features. For instance, details of a convolutional feature (e.g., represented as a convolutional feature map) can be emphasized by increasing the spatial resolution of the convolutional feature map. As an example, a convolutional feature can be upsampled using a 3×3 transposed convolutional kernel. Such, upsampling can encode each convolutional feature into its own channel. For instance, if there are C classes, the convolutional features can be encoded into C channels. However, it should be appreciated that a convolutional feature (e.g., represented by a convolutional feature map) for a particular class can indicate that the feature is not present in an image.

At block 408, upsampled convolutional features can be encoded into sets of class-wise feature maps. For instance, each upsampled convolutional feature can be encoded into a set of class-wise feature maps. During encoding of the upsampled convolutional feature the spatial information of the upsampled convolutional feature can be transformed into the set of class-wise feature maps. In particular, each class-wise feature map of the set of class-wise feature maps can represent a different spatial feature from the upsampled convolutional feature. In encoding the upsampled convolutional feature into the set of class-wise feature maps, the spatial size of each feature of each feature can be reduced (e.g., to the original size of the convolutional feature). For example, a 3×3 channel-wise group convolution can be used to encode an upsampled channel (e.g., upsampled convolutional feature map) into multiple class-wise feature maps (e.g., m class-wise feature maps).

At block 410, the sets of class-wise feature maps can be combined into a category-wise feature map. Combining the class-wise feature maps into a category-wise feature map can create a single representation of all the class-wise feature maps. For instance, the category-wise feature map can combine discriminative information from among the class-wise feature maps into a single representation. In embodiments, the category-wise feature map can be represented using a matrix. As an example, the dimension of the matrix can be C×H×W, where C is the number of channels (e.g. each channel having a set of class-wise feature maps), H is the height, and W is the width. In embodiments, category-wise max-pooling can be used to combine the class-wise feature maps.

At block 412, channel-wise attention maps can be determined. A channel-wise attention map can be used to dynamically re-weight class-wise convolutional feature maps of the category-wise feature map. Re-weighting can explicitly weight class-wise convolutional feature maps based on how the class-wise convolutional feature maps relate to one another. Using a landscape image as an example, there is a relationship between class-wise convolutional feature maps relating to the class: tree and class-wise convolutional feature maps relating to the class: sky. Re-weighting can explicitly weigh such class-wise convolutional feature maps based on this relationship. On the other hand, if there is class-wise convolutional feature maps relating to the class: remote along with class-wise convolutional feature maps relating class: tree and class: sky, re-weighting can downweight the class-wise convolutional feature maps relating to the class: remote (e.g., because there is not a strong relationship between sky and remote or tree and remote).

At block 414, the category-wise feature map can be coupled with the channel-wise attention maps. In embodiments, the category-wise feature map can be the category-wise feature map determined at block 410 (e.g., the combined sets of class-wise feature maps). The channel-wise attention maps can be the channel-wise attention maps determined, for example, at block 412. Coupling the category-wise feature map with the channel-wise attention maps can be performed using an encoder. Using such an encoder, the channel-wise attention maps can be encoded into the category-wise feature map. By encoding the channel-wise attention maps into the category-wise feature map, the channel-wise attention maps can be used to dynamically re-weight the class-wise convolutional feature maps of the category-wise feature map.

At block 416, an output can be generated based on the coupled category-wise feature map and channel-wise attention maps. Such an output can indicate a probability that a label should be assigned to an input image. In embodiments, the output can indicate a probability score(s) related to class. For instance, a probability score can be generated for each class (e.g., of the multi-label classification neural network system). The probability scores for each class can be represented using a vector. For example, the vector can have a number of dimensions, the number of dimensions the same as the number of classes analyzed by the multi-label classification neural network system. In such an example, the probability score of each dimension in the vector can indicate the likelihood that the label corresponding to the class (e.g., of the probability score) should be assigned to the input image. Such probability scores can be a value between 0 and 1.

Figure 5:
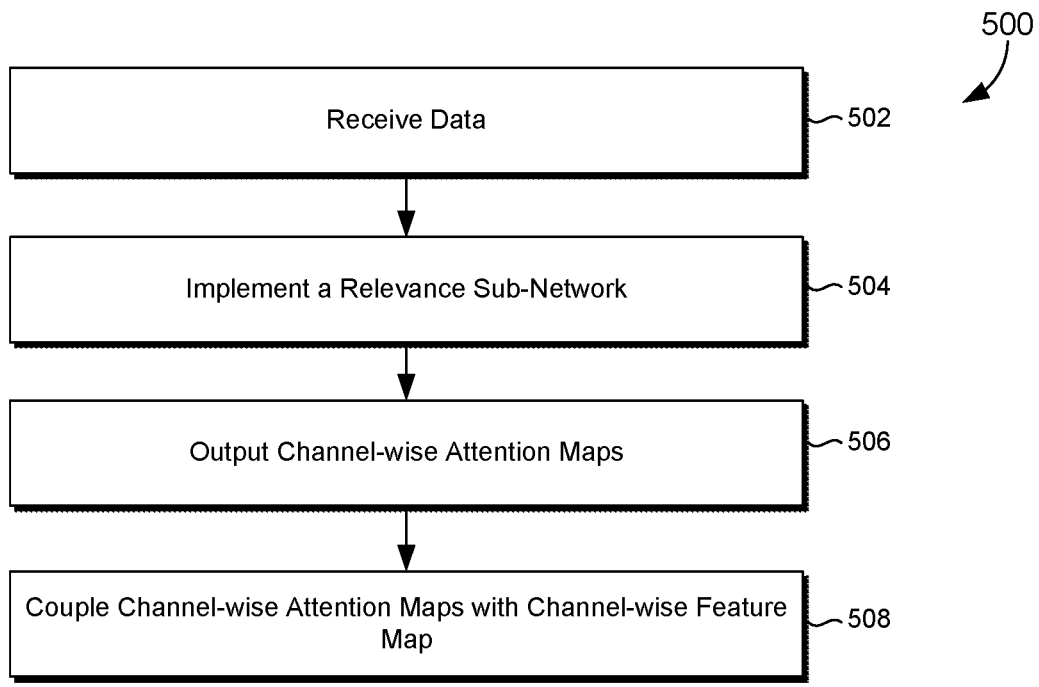
FIG. 5 depicts a process flow showing an embodiment for incorporating a relevance sub-network with a main classification neural network of a multi-label classification neural network system, in accordance with embodiments of the present disclosure.

With reference to FIG. 5, a process flow is provided showing an embodiment of method 500 for incorporating a relevance sub-network with a main classification neural network of a multi-label classification neural network system, in accordance with embodiments of the present disclosure. Aspects of method 500 can be performed, for example, by multi-label classification system 204, as illustrated in FIG. 2.

At block 502, data can be received. In one embodiment, the received data can be from class-wise feature maps. Class-wise feature maps can be thought of as class-independent. Learning relevance directly from class-wise feature maps can allow the relevance sub-network to learn the interdependencies between classes from class-independent features. In another embodiment, the data can be from convolutional feature maps. Learning relevance from convolutional feature maps can allow the relevance sub-network learn the interdependencies between classes while preserving more local detailed information.

At block 504, a relevance sub-network can be implemented. Such a relevance sub-network can be incorporated with a main classification neural network of a multi-label classification neural network system. In particular, in embodiments, the relevance sub-network can be used to apply a dynamic re-weighting operation to aspects of the main classification neural network. Such re-weighting can model interdependencies between different classes of the multi-label classification neural network system. The relevance sub-network can comprise a 1×1 convolutional layer, a batch normalization layer, and a max-pooling layer.

At block 506, channel-wise attention maps can be output. Such channel-wise attention maps can be used during the dynamic re-weighting operation. For example, the channel-wise attention maps can model the interdependencies between different classes. In this way, the channel-wise attention maps can be output by the relevance sub-network. In the relevance sub-network outputting the channel-wise attention maps, the channel-wise attention maps can be coupled with a channel-wise feature map of the main classification neural network at block 508. Coupling the channel-wise attention maps with the channel-wise feature map can incorporate the explicitly learned relevance between classes from the relevance sub-network into the multi-label classification neural network system. In embodiments, an encoder can be used to perform the coupling between the channel-wise attention maps and the channel-wise feature map. In instances, a residual connection can encode the channel-wise attention maps into the class-wise convolutional feature maps that comprise the category-wise feature map. In performing the coupling, the channel-wise attention maps can be used to dynamically re-weight the class-wise convolutional feature maps of the category-wise feature map. Dynamic re-weighting can incorporate the learned interdependencies between different classes (e.g., from the relevance sub-network) into the multi-label classification neural network system.

Figure 6:
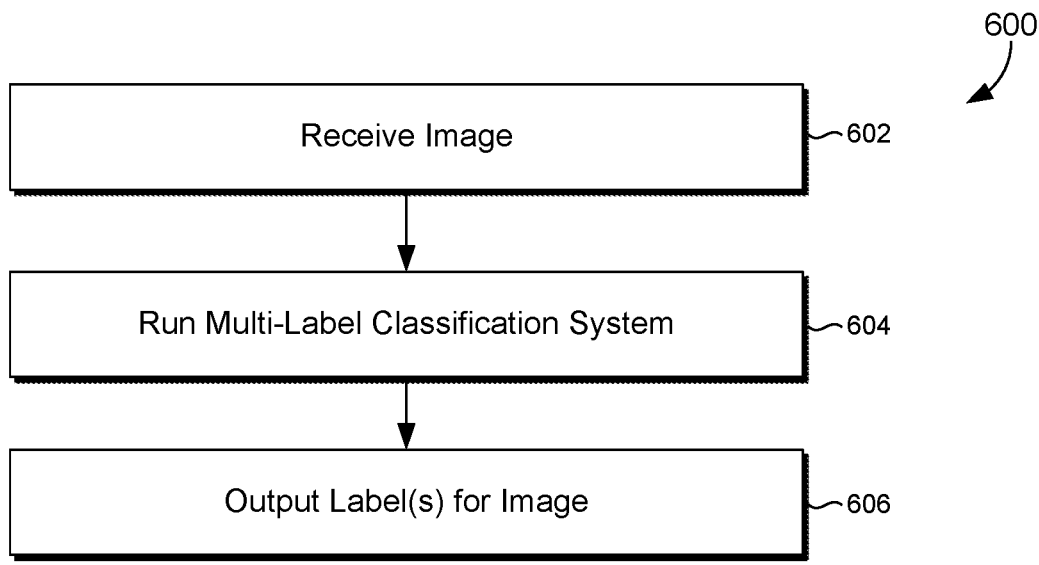
FIG. 6 depicts a process flow showing an embodiment for utilizing a multi-label classification system to identify labels for an image, in accordance with embodiments of the present disclosure.

With reference to FIG. 6, a process flow is provided showing an embodiment of method 600 for utilizing a multi-label classification system to identify labels for an image, in accordance with embodiments of the present disclosure. Aspects of method 600 can be performed, for example, by multi-label classification system 204, as illustrated in FIG. 2.

At block 602, an image can be received. For instance, such a received image can be selected or input into multi-label classification system. The image can be selected or input in any manner. As an example, an image can be input by using a camera function on a device to take a picture. As another example, a desired image can be selected from a repository.

Upon receiving the image, at block 604, the multi-classification system can be run. Running the multi-classification system can include implementing a trained and tested multi-label classification neural network system. In one embodiment, such a multi-label classification neural network system can be comprised of a feature extraction neural network, a main classification neural network, and a relevance sub-network. For instance, the feature extraction neural network can extract features of interest from the received image. Such extracted features can be represented using one or more convolutional feature maps. In some embodiments, the convolutional feature maps can be upsampled (e.g., increase resolution) by the main classification neural network to emphasize spatial details. The main classification neural network can transform these convolutional feature maps into sets of class-wise feature maps. In embodiments where the convolutional feature maps are upsampled, the main classification neural network can downsample (e.g., reduce resolution) the class-wise feature maps to decrease the spatial size of the features in the class-wise feature maps. The main classification neural network can also combine the sets of class-wise feature maps into a category-wise feature map. The relevance sub-network can model the relevance between the class-wise feature maps of the main classification neural network by generating channel-wise attention maps. These channel-wise attention maps can be coupled with the class-wise feature maps that comprise the category-wise feature map. Such coupling can incorporate learned interdependencies between different classes by weighting the class-wise feature maps using the channel-wise attention maps. The coupled channel-wise attention maps and category-wise feature map can be used to generate an output. This output (e.g., from the multi-classification system) can indicate a probability score (s) related to class. For instance, a probability score can be generated for each class. The probability score related to each class can indicate the likelihood that the label corresponding to the class (e.g., of the probability score) should be assigned to the input image.

At block 606, label(s) can be output for the image. The image can be the image received at block 602. The labels can related to the classes of the multi-classification system. For instance, the classes can relate to the labels that can be output by the multi-label classification system. A label can be output for an image based on probability score. The probability score for each class can have a value between 0 and 1 (e.g., by applying a Sigmoid layer). To determine whether a label corresponding to a class should be output for an image, a threshold level can be set (e.g., 0.5, 0.75, 0.8). As a non-limiting example, the threshold level can be set to 0.5. In such an example, a label can be output with the final probability score for that class is greater than or equal to 0.5.

An output label(s) can be provided, for example, to a user. For example, output label(s) can be displayed via a display screen of a user device. In some instances, labels can be displayed using visualizations. In one embodiment, the visualization can be a list of one or more labels output for an image. In another embodiment, the visualization can be one or more heat maps indicating features in the image that relate to one or more labels. For instance, a heat map indicating a tree in an image, the heat map related to the label: tree.

Figure 7:
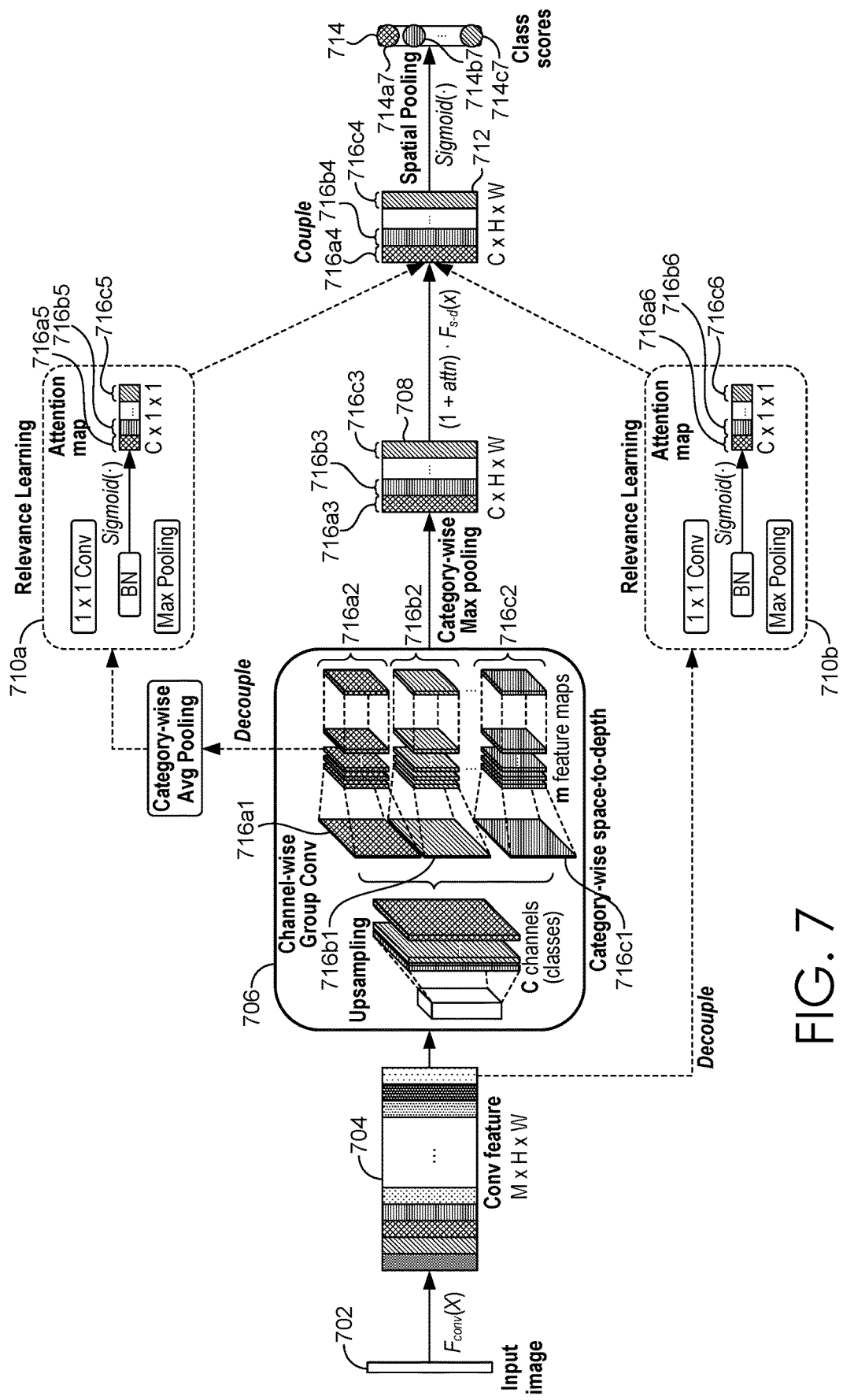
FIG. 7 illustrates an example environment that can be used for training and/or implementing a multi-label classification system using a multi-label classification neural network system, in accordance with embodiments of the present disclosure.

FIG. 7 illustrates an example environment 700 that may be used for training and/or implementing a multi-label classification system using a multi-label classification neural network system, in accordance with embodiments of the present disclosure. As depicted, the multi-label classification neural network system can be implemented using a feature extraction neural network, a main classification neural network, and a relevance sub-network.

Input image 702 can be input into a multi-label classification neural network system. For instance, input image 702 can be input into a feature extraction neural network to determine convolutional feature maps 704 for the input image. Such a feature extraction neural network can use an encoder (e.g., $F_{conv}(X)$) to determine the convolutional feature maps. The convolutional feature maps can be represented, for example, using a matrix. The dimension of the matrix can be M×H×W, where M is the number of convolutional feature maps, H is the height, and W is the width. As depicted, each color of convolutional feature maps 704 can represent a convolutional feature map related to a class.

Category-wise space-to-depth 706 can be run using a main classification neural network. The main classification neural network can upsample convolutional feature maps 704 into a number of channels based on class (e.g., as depicted, using color/shading/hashing). Upsampling can encode each convolutional feature into its own channel (e.g., 716c1, 716b1, 716a1). The upsampled convolutional features can then be encoded into sets of class-wise feature maps for each channel (e.g., sets of 716a2, sets of 716b2, sets of 716c2). Each class-wise feature map of the set of class-wise feature maps can represent a different spatial feature from the upsampled convolutional feature (e.g., indicated by different shades of color). In encoding the upsampled convolutional feature into the set of class-wise feature maps, the spatial size of each feature of each feature can be reduced (e.g., to the original size of the convolutional feature).

The sets of class-wise feature maps can be combined into channel-wise feature map 708. Channel-wise feature map 708 can be a single representation of all the class-wise feature maps. For instance, channel-wise feature map 708 can be a single representation of 716a3 (e.g., combined sets of class-wise feature maps 716a2), 716b3 (e.g., combined sets of class-wise feature maps 716b2), and 716c3 (e.g., combined sets of class-wise feature maps 716c2). Category-wise max-pooling can be used to combine the class-wise feature maps into channel-wise feature map 708.

Channel-wise attention maps can be determined using relevance sub-network 710a or relevance sub-network 710b. Relevance sub-network 710a can use class-wise feature maps taken from category-wise space-to-depth 706. Learning relevance directly from class-wise feature maps can allow the relevance sub-network to learn the interdependencies between classes from class-independent features. Relevance sub-network 710a can comprise a 1×1 convolutional layer, a batch normalization layer, and a max-pooling layer. Relevance sub-network 710a can receive class-wise feature maps. In embodiments, the class-wise feature maps can be combined using category-wise average-pooling. The class-wise feature maps can be run through the convolutional layer, the batch normalization layer, and the max-pooling layer of relevance sub-network 710a. Relevance sub-network 710a can then use a Sigmoid layer as an activation function. Relevance sub-network 710a can then output channel-wise attention maps. The channel-wise attention maps can be represented, for example, using a matrix. The dimension of the matrix can be C×1×1, where C is the number of channels (e.g. from category-wise space-to-depth 706). Such channels can correspond to the channels of the main classification neural network (e.g., 716a5, 716b5, 716c5).

Relevance sub-network 710b can use convolutional feature maps taken from convolutional feature maps 704. Learning relevance from convolutional feature maps can allow the relevance sub-network learn the interdependencies between classes while preserving more local detailed information. Relevance sub-network 710b can comprise a 1×1 convolutional layer, a batch normalization layer, and a max-pooling layer. Relevance sub-network 710b can receive convolutional feature maps. The convolutional feature maps can be run through the convolutional layer, the batch normalization layer, and the max-pooling layer of relevance sub-network 710b. Relevance sub-network 710b can then use a Sigmoid layer as an activation function. Relevance sub-network 710b can then output channel-wise attention maps. The channel-wise attention maps can be represented, for example, using a matrix. The dimension of the matrix can be C×1×1, where C is the number of channels (e.g. from category-wise space-to-depth 706). Such channels can correspond to the channels of the main classification neural network (e.g., 716a6, 716b6, 716c6).

The channel-wise attention maps (e.g., from relevance sub-network 710a or relevance sub-network 710b) can be coupled with channel-wise feature map 708. For instance, the channel-wise attention maps (e.g., (1+attn)) can be encoded using an encoder (e.g., $F_{s-d}(x)$) into the category-wise feature map of the combined class-wise feature maps (e.g., represented as a C×H×W matrix). Couple 712 can be the combined class-wise feature maps (e.g., category-wise feature map) coupled with the channel-wise attention maps. For instance, Couple 712 can be channel-wise feature map 708 (e.g., 716a3, 716b3, and 716c3) coupled with a channel-wise attention maps from relevance sub-network 710a (e.g., 716a5, 716b5, 716c5). Coupling the channel-wise feature map 708 with the channel-wise attention maps can weight 716a3, 716b3, and 716c3 using, for example, 716a5, 716b5, 716c5, respectively. In another embodiment, channel-wise attention maps from relevance sub-network 710b (e.g., 716a6, 716b6, 716c6) can be used instead of the channel-wise attention maps from relevance sub-network 710a. Couple 712 can be used to determine probability scores for each class. To obtain the probability scores 714 for each class, spatial pooling can be used along with a Sigmoid layer as an activation function. For instance, probability scores 714 can comprise probability scores for 716a7, 716b7, and 716c7. To determine whether a label corresponding to a class should be reported, a threshold level can be set for probability scores 714 (e.g., 0.5, 0.75, 0.8). In embodiments, the threshold level can be set to 0.5. In such an embodiment, a label can be reported for probability scores 714 for classes greater than or equal to 0.5. In some embodiments, probability scores can be determined using channel-wise attention maps from relevance sub-network 710a and then probability scores can be determined using channel-wise attention maps from relevance sub-network 710b. In such embodiments, the probability scores can then be averaged to determine whether a label corresponding to a class should be reported.

Figure 8A:
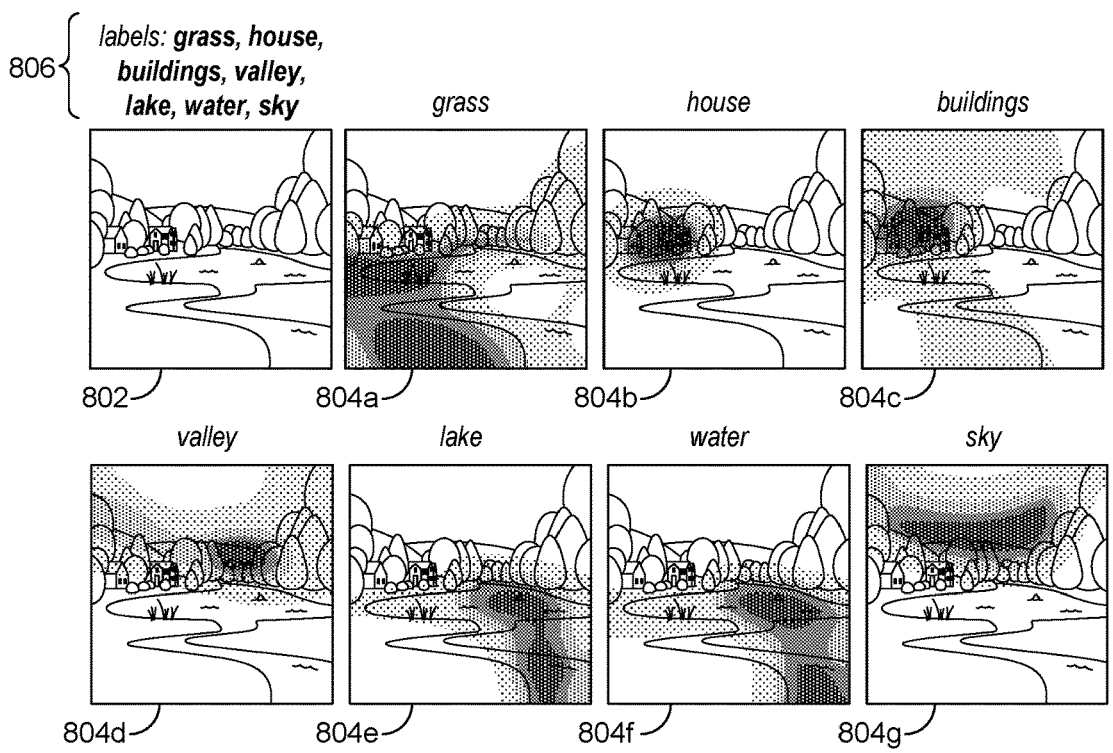
FIGS. 8A-8C illustrate example output from a multi-label classification system implemented using a multi-label classification neural network system, in accordance with embodiments of the present disclosure.
Figure 8B:
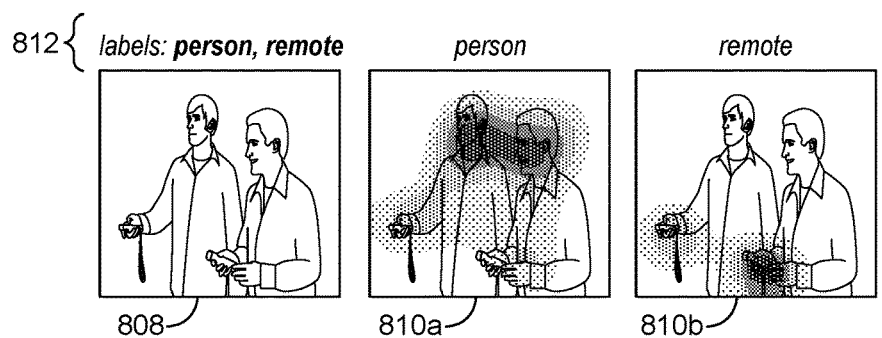
Figure 8C:
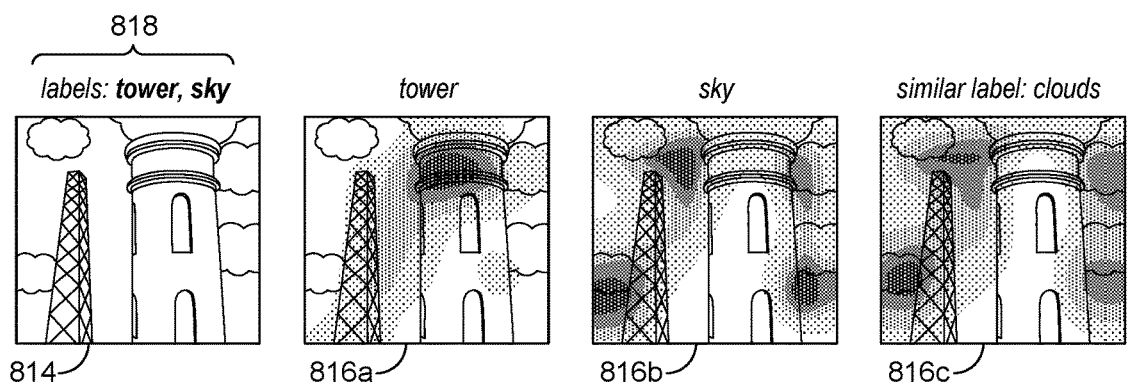

FIGS. 8A-8C illustrate example output from a multi-label classification system implemented using a multi-label classification neural network system, in accordance with embodiments of the present disclosure. As depicted, the multi-label classification neural network system can output labels and/or heat maps. A heat map can be a topography indicating the concentration of a feature in an image. For instance, a heat map can be a two-dimensional representation of data ( cation of a feature in an age) in which values (e.g., indicating the presence of the feature) are represented by colors. As an example, a heat map of a tree in an image can indicate the location of the tree in the image such that the head map is centered on the tree.

FIG. 8A illustrates output from a multi-label classification system implemented for input image 802. The output includes heat maps 804a-g and labels 806 for input image 802. As illustrated, labels 806 can include grass, house, buildings, valley, lake, and sky. As further illustrated, heat maps include heat map 804a depicting grass, heat map 804b depicting house, heat map 804c depicting buildings, heat map 804d depicting valley, heat map 804e depicting lake, heat map 804f depicting water, and heat map 804g depicting sky. Such heat maps indicate locations of features in input image 802 that corresponds to one or more labels (e.g., that relate to a class).

FIG. 8B illustrates output from a multi-label classification system implemented for input image 808. The output includes heat maps 810a-b and labels 812 for input image 808. As illustrated, labels 812 can include person and remote. As further illustrated, heat maps include heat map 810a depicting person and 810b depicting remote. Such heat maps as 810b indicate the advantages of the multi-label classification neural network system upsampling convolutional feature maps to emphasize spatial details. For instance, such upsampling allows the multi-label classification neural network system to be capable of identifying and labeling features that are small.

FIG. 8C illustrates output from a multi-label classification system implemented for input image 814. The output includes heat maps 816a-c and labels 818 and similar labels 820 for input image 814. As illustrated, labels 818 can include tower and sky and similar labels 820 can include clouds. As further illustrated, heat maps include heat map 816a depicting tower, heat map 816b depicting sky, and heat map 816c depicting clouds. Similar labels 820 can be identified, for example, during training, that are labels identified in addition to ground truth labels. In embodiments, similar labels 820 can be combined with labels 818 and output at one list of labels identified for input image 814.

Figure 9:
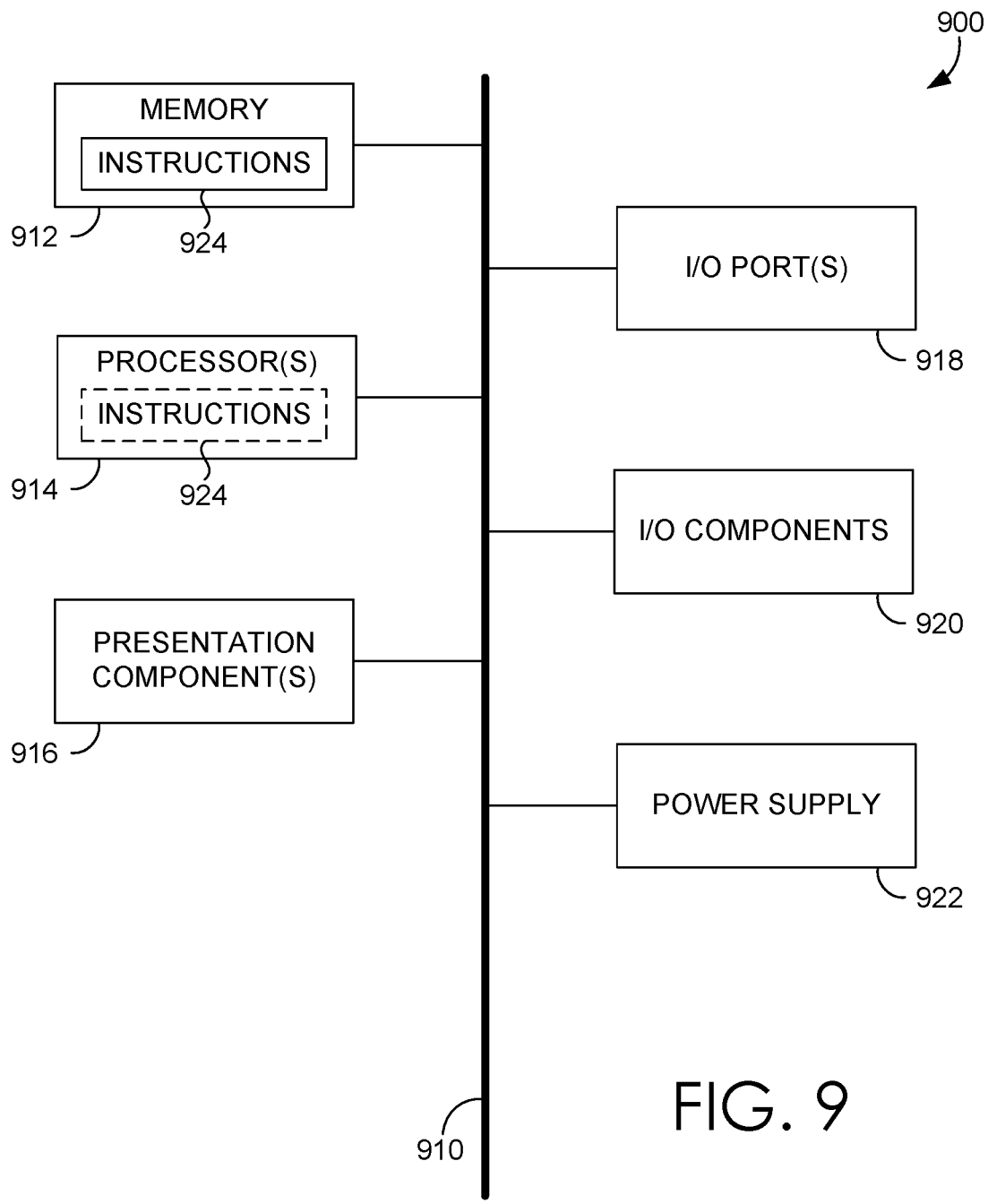
FIG. 9 is a block diagram of an example computing device in which embodiments of the present disclosure may be employed.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable media having a plurality of executable instructions embodied thereon, which, when executed by one or more processors, cause the one or more processors to perform a method, the method comprising:
receiving an image having a plurality of features, wherein each feature corresponds to at least one of a plurality of classes;
determining a plurality of convolutional feature maps of the image;
generating, using a multi-label classification neural network system, a plurality of class-wise feature maps for the plurality of convolutional feature maps of the image, wherein a class-wise feature map represents a spatial feature related to a convolutional feature map of the image;
determining a plurality of channel-wise attention maps that indicate class relevance between the plurality of classes;
combining the plurality of class-wise feature maps and coupling the combined class-wise feature maps with the plurality of channel-wise attention maps;

generating a probability score related to each of the plurality of classes based on the coupling of combined class-wise feature maps with the plurality of channel-wise attention maps; and outputting a plurality of labels for the image, wherein each label is based at least in part on the probability score related to the class corresponding to a feature.

2. The media non-transitory computer-readable of claim 1, the method further comprising:
analyzing the probability score for a first class based on a predefined threshold level score; and
outputting a first label based on the probability score for the first class in relation to the predefined threshold level score.

3. The media non-transitory computer-readable of claim 1, the method further comprising:
generating a first heat map for a first class based at least in part on the coupling of combined class-wise feature maps with the plurality of channel-wise attention maps, wherein the heat map provides a visualization mapping locations of a feature of the image corresponding to one of the plurality of outputted labels.

4. The media non-transitory computer-readable of claim 2, the method further comprising:
training the multi-label classification neural network system, wherein training comprises:
receiving a training image,
generating a training probability score vector for the training image,
determining an error based on differences between the training probability score vector and a ground-truth probability score vector, and
updating the multi-label classification neural network system based on the error.

5. The media of non-transitory computer-readable claim 4, wherein the error is determined using binary cross-entropy loss.

6. The media of non-transitory computer-readable claim 1, wherein the plurality of channel-wise attention maps are generated using a relevance sub-network to process the plurality of class-wise feature maps and enable determination of relevance between the plurality of classes based at least in part on class-independent features of the image.

7. The media of non-transitory computer-readable claim 1, wherein the plurality of channel-wise attention maps are generated using a relevance sub-network to process the plurality of convolutional feature maps and enable determination of relevance between the plurality of classes based at least in part on local detailed information relating to features of the image.

8. The media non-transitory computer-readable of claim 1, wherein the coupling of combined class-wise feature maps with the plurality of channel-wise attention maps produces a category-wise feature map that dynamically re-weights the combined class-wise feature maps based on the plurality of channel-wise attention maps.

9. A computer-implemented method comprising:
receiving an image having a plurality of features, wherein each feature corresponds to at least one of a plurality of classes;
determining a plurality of convolutional feature maps of the image based at least in part on the plurality of features;
increasing spatial resolution of the convolutional feature maps of the image;
generating, using a multi-label classification neural network system, a plurality of class-wise feature maps for each of the plurality of convolutional feature maps of the image, wherein a class-wise feature map represents a spatial feature related to a convolutional feature map of the image;
combining the plurality of class-wise feature maps into a category-wise feature map;
determining a plurality of channel-wise attention maps that indicate class relevance between the plurality of classes;
coupling the category-wise feature map with the plurality of channel-wise attention maps; and
generating a probability score related to each of the plurality of classes based on the coupling of the category-wise feature map with the plurality of channel-wise attention maps; and
outputting a plurality of labels for the image, wherein each label is based at least in part on the probability score related to the class corresponding to a feature.

10. The computer-implemented method of claim 9, further comprising:
analyzing the probability score for a first class based on a predefined threshold level score; and
outputting a first label based on the probability score for the first class in relation to the predefined threshold level score.

11. The computer-implemented method of claim 9, further comprising:
generating a first heat map for a first class based at least in part on the coupling of the category-wise feature map with the channel-wise attention maps, wherein the heat map provides a visualization mapping locations of a feature of the image corresponding to one of the plurality of outputted labels.

12. The computer-implemented method of claim 9, wherein the plurality of class-wise feature maps have a decreased spatial resolution, the decreased spatial resolution being a spatial resolution of the convolutional feature maps.

13. The computer-implemented method of claim 9, wherein the plurality of channel-wise attention maps are generated using a relevance sub-network to process the plurality of class-wise feature maps and enable determination of relevance between the plurality of classes based at least in part on class-independent features of the image.

14. The computer-implemented method of claim 9, wherein the plurality of channel-wise attention maps are generated using a relevance sub-network to process the plurality of convolutional feature maps and enable determination of relevance between the plurality of classes based at least in part on local detailed information relating to features of the image.

15. The computer-implemented method of claim 9, wherein coupling of the category-wise feature map with the plurality of channel-wise attention maps dynamically re-weights the category-wise attention map based on the channel-wise attention maps.

16. A computing system comprising:
one or more processors; and
one or more non-transitory computer-readable storage media, coupled with the one or more processors, having instructions stored thereon, which, when executed by the one or more processors, cause the computing system to:
determine a plurality of convolutional feature maps of an image having a plurality of features, wherein each feature corresponds to at least one of a plurality of classes;

generate, using a multi-label classification neural network system, a plurality of class-wise feature maps for each of the plurality of convolutional feature maps of the image, wherein a class-wise feature map represents a spatial feature related to a convolutional feature of the image;

combine the plurality of class-wise feature maps into a category-wise feature map;

determine a plurality of channel-wise attention maps wherein a channel-wise attention map indicates class relevance between the plurality of classes;

couple the category-wise feature map with plurality of channel-wise attention maps; and generate an output related to each of the plurality of classes based on the coupled category-wise feature map and plurality of channel-wise attention maps, wherein the output indicates the probability of associating a label for each of the plurality of classes with the corresponding features of the image.

17. The system of claim 16, wherein the output is a plurality of labels each based on a probability for a class based on the coupled category-wise feature map and the plurality of channel-wise attention maps in relation to a predefined threshold level score.

18. The system of claim 16, wherein the output further comprises a heat map based at least in part on the coupled category-wise feature map and the plurality of channel-wise attention maps, wherein the heat map provides a visualization mapping locations of a feature of the image corresponding to one of the plurality of labels.

19. The system of claim 16, wherein the plurality of channel-wise attention maps are generated using a relevance sub-network to process the plurality of class-wise feature maps and enable determination of relevance between the plurality of classes based at least in part on class-independent features of the image.

20. The system of claim 16, wherein the plurality of channel-wise attention maps are generated using a relevance sub-network to process the plurality of convolutional feature maps and enable determination of relevance between the plurality of classes based at least in part on local detailed information relating to features of the image.

* * * * *